United States Patent [19]

Aramaki et al.

[11] Patent Number: 4,711,949

[45] Date of Patent: Dec. 8, 1987

[54] METHOD OF CONVERTING FLUORINE-CONTAINING HIGH POLYMER INTO LOWER MOLECULAR WEIGHT POLYMER

[75] Inventors: Minoru Aramaki; Hiroaki Sakaguchi, both of Ube, Japan

[73] Assignee: Central Glass Company Limited, Ube, Japan

[21] Appl. No.: 797,463

[22] Filed: Nov. 13, 1985

[30] Foreign Application Priority Data

Nov. 14, 1984 [JP] Japan .................................. 59-238234
Jan. 10, 1985 [JP] Japan ..................................... 60-1461

[51] Int. Cl.⁴ ............................................... C08F 8/22
[52] U.S. Cl. .................................. 525/356; 525/326.4; 525/374
[58] Field of Search ................................ 525/356, 374

[56] References Cited

U.S. PATENT DOCUMENTS 3,067,262  12/1962  Brady ............................... 260/653.1

FOREIGN PATENT DOCUMENTS

| | | |
|---|---|---|
| 600145 | 4/1948 | United Kingdom . |
| 761053 | 11/1956 | United Kingdom . |
| 1400179 | 7/1975 | United Kingdom . |
| 1542813 | 3/1979 | United Kingdom . |

*Primary Examiner*—Joseph L. Schofer
*Assistant Examiner*—Bernard Lipman
*Attorney, Agent, or Firm*—Fleit, Jacobson, Cohn & Price

[57] ABSTRACT

A fluorine-containing high polymer, e.g. polytetrafluoroethylene, can easily and efficiently be converted into a wax-like lower molecular weight polymer by contact reaction of the high polymer with a gas comprising a fluorinating agent, which is selected from molecular fluorine, nitrogen-fluorine compounds represented by $NF_3$, halogen fluorides represented by $ClF_3$ and fluorides of rare gas elements represented by $XeF_2$, at a temperature in the range from 250° to 550° C.

4 Claims, No Drawings

METHOD OF CONVERTING FLUORINE-CONTAINING HIGH POLYMER INTO LOWER MOLECULAR WEIGHT POLYMER

BACKGROUND OF THE INVENTION

This invention relates to a method of converting a fluorine-containing high polymer such as, for example, polytetrafluoroethylene into a wax-like lower molecular weight polymer.

Relatively low molecular weight polymers and copolymers of some fluorine-containing organic compounds are known for their excellent lubricating property and characteristically low surface energy and accordingly are widely used as lubricants, releasing agents, etc. Particularly, low molecular weight polytetrafluoroethylene (PTFE) is popular by the common name of tetrafluoroethylene (TFE) wax.

A well known and industrially employed method for preparing TFE wax is telomerization of TFE. However, this method has many problems difficult to solve satisfactorily. For example, where a compound employed as the telogen is utilized also as reaction medium, very complex techniques are required for controlling the reaction conditions and also for controlling the molecular weight of the product. Besides, separation of the monomer and the telogen from the telomer is not easy. Where an aqueous reaction medium is used, major problems reside in insufficiency of thermal stability of the synthesized wax and difficulty in separating unreacted monomer from the telomer.

Another way to obtain TFE wax is to reduce the molecular weight of PTFE by controlled thermal decomposition. According to proposals already made for this purpose, PTFE is thermally decomposed to a desired extent in the presence of a catalytic substance such as silicon, aluminum, magnesium or graphite, or in the presence of a sort of degradation promoter such as air, oxygen, sulfur dioxide or nitric monoxide, or in a fused salt such as potassium or sodium nitrate. A problem inherent to such thermal decomposition methods is the generation of noxious gases of which disposal is very troublesome in industrial practice. There is another problem that the quality of the product is unintendedly variable when scrap of PTFE is used as the raw material by reason of expensiveness of PTFE.

Recently, controlled decomposition of PTFE by radiation such as X-ray or gamma-ray is under development. From an industrial point of view, however, using radiation is generally unwelcome because it is troublesome and usually costly and requires regulation facilities.

SUMMARY OF THE INVENTION

It is an object of the present invention to provide a method of easily and efficiently converting a fluorine-containing high polymer such as, e.g., PTFE or a copolymer of TFE into a lower molecular weight polymer which is useful as a fluoro-polymer wax.

A method according to the invention to accomplish the above object comprises the step of subjecting a fluorine-containing high polymer to contact reaction with a gas comprising at least one fluorine source material, which is selected from molecular fluorine, binary compounds of fluorine and nitrogen, fluorides of halogens and fluorides of rare gas elements, at a temperature in the range from about 250° C. to about 550° C.

In the method according to the invention the fluorine source material provides fluorine radical, which acts on the fluorine-containing high polymer to sever the principal chain of the high polymer. Furthermore, the fluorine radical couples with the terminal radicals of the severed polymer chains. Accordingly the lower molecular weight polymers obtained by this method generally have —$CF_3$ groups at the terminals and, therefore, are very stable.

One of the advantages of using a strong fluorinating agent in this method is that the reaction forms only small amounts of by-products which are gaseous compounds safe and convenient for handling. More particularly, the by-products usually include low-carbon fluorocarbons such as $CF_4$, $C_2F_6$ and $C_3F_8$ and, depending on the kind of the fluorinating agent, may further include some carbon halides or a rare gas. Since free carbon is not liberated by the reaction, a pure white product is obtained.

Average molecular weight of a fluorine-containing lower molecular weight polymer obtained by this method is variable over a wide range from $10^5$ to $10^3$ and can arbitrarily be controlled by controlling the reaction conditions. In general, the molecular weight of the product becomes smaller as the grain or particle size of the starting high polymer is reduced, as the amount of the fluorinating agent is increased, as the reaction temperature is made higher and as the reaction time is extended. It is also an advantage of the method according to the invention that a desired low molecular weight polymer is obtained with very high yields.

By the method according to the invention it is possible to obtain wax-like low molecular weight polymers which are easy to pulverize. In many cases it is possible to accomplish size reduction to a mean particle size of about 100 $\mu$m by ordinary hammer mills and to a mean particle size of 10–0.1 $\mu$m by using jet mills.

DESCRIPTION OF THE PREFERRED EMBODIMENTS

Fluorine-containing high polymers for use in this invention are not necessarily limited. In view of the state of the art, typical examples are PTFE, copolymers of tetrafluoroethylene (TFE) and hexafluoropropylene (HFP), copolymers of TFE and perfluoroalkoxyethylene (PFA), copolymers of ethylene and TFE, polychlorotrifluoroethylene (PCTFE), poly(vinylidene fluoride) and poly(vinyl fluoride). The high polymers can be subjected to the reaction in any form: not only powders but also pellets, sheets, and irregularly shaped scraps can be used. Furthermore, it is possible to use a high polymer resin containing a filler.

The fluorinating agent in this invention can be selected from fluorine gas and some kinds of fluorine compounds as mentioned hereinbefore. As to binary compounds of fluorine and nitrogen, preferred examples are nitrogen difluoride $NF_2$, nitroghe trifluoride $NF_3$, tetrafluorohydrazine $N_2F_4$, difluorodiazine $N_2F_2$ and fluoroazine $N_3F$. Among these fluorine-nitrogen compounds, $NF_3$ (m.p. −206.8° C., b.p. −129.1° C.) is very convenient for practical use since this compound is a colorless and stable gas at room temperature and readily provides fluorine radical at temperatures above about 300° C. As to fluorides of halogens, preferred examples are chlorine monofluoride ClF, chlorine trifluoride $ClF_3$, chlorine pentafluoride $ClF_5$, bromine monofluoride BrF, bromine trifluoride $BrF_3$, bromine pentafluoride $BrF_5$, iodine trifluoride $IF_3$, iodine pentafluoride IF$_5$ and iodine heptafluoride IF$_7$. As to fluorides of rare gas elements, preferred examples are xenon difluoride XeF$_2$, xenon tetrafluoride XeF$_4$, xenon hexafluoride XeF$_6$ and krypton difluoride KrF$_2$. If desired, it is possible to use a combination of fluorine gas and a fluoride or a combination of two kinds of fluorides.

The amount of the fluorinating agent relative to the fluorine-containing high polymer is variable over a very wide range. In general, the minimum amount of the fluorinating agent required for treatment of 100 parts by weight of a fluorine-containing high polymer is 0.01 part by weight, calculated as F. The use or presence of an excess of the fluorinating agent does not offer a serious problem since the excess portion remains unreacted and can easily be recovered. From a practical point of view, it is suitable to use not more than about 10 parts by weight of F per 100 parts by weight of a fluorine-containing high polymer.

The reaction according to the invention can be carried out in a reactor of any type so long as the reactor is suited to gas-solid contact reactions. For example, it is very suitable to use a reactor of a forced gas recirculation type provided with many stages of reaction plates or trays or a reactor of a fluidized bed type from the viewpoint of the efficiency of gas-solid contact. The gas pressure in the reaction system may be elevated to thereby enhance the rate of reaction, but the reaction according to the invention proceeds at a practically sufficiently high rate even at the atmospheric pressure. It is permissible to bring a selected fluorinating agent in its practically pure form into contact with a selected fluorine-containing high polymer. However, in many cases in the practice of the invention it will be more convenient to dilute the fluorinating agent with an inactive gas such as, for example, nitrogen, argon, helium or carbon tetrachloride.

The invention will further be illustrated by the following nonlimitative examples.

EXAMPLE 1

A PTFE sheet having a thickness of 3 mm (formed by sintered moulding) was cut into 5 mm square pieces, and 500 g of the PTFE pieces was charged into a 20-liter reactor which was made of nickel and was provided with a heater and a fan for forced agitation of gaseous reactants. Initially the reactor was filled with nitrogen gas, and the temperature in the reactor was raised to 440° C. Then a portion of the nitrogen gas was extracted by operating a vacuum pump, and 3 g of F$_2$ gas was introduced into the reactor to start reaction. At this stage the concentration of F$_2$ in the mixed gas in the reactor was 23%, and the gas pressure was 1 atm. The temperature in the reactor was maintained at about 440° C., and the fan was continuously operated. In this state the reaction was continued for 2 hr.

As the result the F$_2$ gas was mostly consumed in severing the molecular chain of PTFE with formation of small amounts of CF$_4$, C$_2$F$_6$ and C$_3$F$_8$ as gaseous by-products, and the solid pieces of PTFE turned into a melt of a snow-white wax which weighed 498 g. Therefore, the yield of the solid product was 99.6%. This wax had a melting point of 305° C., and the molecular weight of this wax was calculated to be 4600 from the following relationship between melting point (T$_m$) and molecular weight (MW), shown in U.S. Pat. No. 3,067,262.

$$MW = \frac{200}{685\{1/T_m(°K.) - 1/600\}}$$

After a preliminary size reduction treatment, it was possible to pulverize the wax by a jet mill into fine particles having a mean particle size of about 5 $\mu$m.

EXAMPLE 2

632 g of the PTFE pieces mentioned in Example 1 was charged into the reactor used in Example 1. After the preliminary operations described in Example 1, 8 g of NF$_3$ gas was introduced into the reactor which had been filled with nitrogen gas and heated at 440° C. At the start of the reaction the concentration of NF$_3$ in the mixed gas in the reactor was 33%, and the gas pressure was 1 atm. The reaction was carried out for 2 hr at about 440° C. while the fan was continuously operated.

As the result the NF$_3$ gas was mostly consumed in severing the molecular chain of PTFE with formation of small amounts of CF$_4$, C$_2$F$_6$ and C$_3$F$_8$ as gaseous by-products, and the solid pieces of PTFE turned into a melt of a snow-white wax which weighed 626 g. Therefore, the yield of the solid product was 99%. This wax had a melting point of 300° C., and the molecular weight was 3700 by the calculation described in Example 1. After a preliminary size reduction treatment, the wax was pulverized by a jet mill into fine particles having a mean particle size of about 5 $\mu$m.

EXAMPLE 3

In place of the PTFE pieces in the above examples, 632 g a PTFE powder for moulding use was subjected to reaction with 24 g of NF$_3$ by the same method as in Example 2, except that the reaction temperature was lowered to 400° C. and that the reaction time was extended to 16 hr.

As the result, 629 g (yield 99.5%) of low molecular weight PTFE in the form of wax was obtained. Small amounts of by-produced CF$_4$, C$_2$F$_6$ and C$_3$F$_8$ were contained in the nitrogen gas recovered from the reactor. The wax had a melting point of 318° C. and an average molecular weight of 11700. It was possible to pulverize this wax into fine particles having a mean particle size of about 7 $\mu$m.

EXAMPLE 4

By the same method as in Example 3, 50 g of the PTFE powder mentioned in Example 3 was subjected to reaction with 1 g of N$_2$F$_4$ at 400° C. for 10 hr.

As the result 49.5 g (yield 99%) of low molecular weight PTFE in the form of wax was obtained, and small amounts of by-produced CF$_4$, C$_2$F$_6$ and C$_3$F$_8$ were contained in the nitrogen recovered from the reactor. This wax had a melting point of 310° C. and an average molecular weight of 6100. The wax could easily be pulverized into fine particles.

EXAMPLE 5

By the same method as in Example 3, 500 g of the PTFE powder was subjected to reaction with 8 g of ClF$_3$ at 420° C. for 4 hr.

As the result 498 g of low molecular weight PTFE in the form of wax was obtained. In this case gaseous by-products were mostly CClF$_3$, CCl$_2$F$_2$ and CCl$_3$F and included small amounts of CF$_4$, C$_2$F$_6$ and C$_3$F$_8$. This wax had a melting point of 310° C. and an average molecular weight of 6100. It was possible to pulverize the wax into fine particles having a mean particle size of about 7 μm.

EXAMPLE 6

By the same method as in Example 3, 500 g of the PTFE powder was subjected to reaction with 12 g of $XeF_2$ at 400° C. for 2 hr.

As the result 497 g (yield 99.4%) of low molecular weight PTFE in the form of wax was obtained. In this case, gaseous by-products were Xe, $CF_4$, $C_2F_6$ and $C_3F_8$. This wax had a melting point of 326° C. and an average molecular weight of 105000. This wax was also easy to finely pulverize.

EXAMPLE 7

A TFE/HFP copolymer sheet having a thickness of 3 mm was cut into 5 mm square pieces. By the same method as in Example 1, 620 g of the TFE/HFP pieces was subjected to reaction with 8 g of $NF_3$ at 420° C. for 3 hr.

As the result 615 g (yield 99.2%) of a low molecular weight copolymer in the form of wax was obtained. In this case, gaseous by-products were small amounts of $CF_4$, $C_2F_6$ and $C_3F_8$. This wax had a melting point of 244° C. and could easily be pulverized.

EXAMPLE 8

By the same method, 500 g of the TFE/HFP copolymer pieces was subjected to reaction with 10 g of $BrF_3$ at 420° C. for 3 hr.

As the result 495 g (yield 99.0%) of a low molecular weight copolymer in the form of wax was obtained. In this case, gaseous by-products were mostly $CBrF_3$, $CBr_2F_2$ and $CBr_3F$ and included small amounts of $CF_4$, $C_2F_6$ and $C_3F_8$. The wax had a melting point of 240° C. and could easily be pulverized.

EXAMPLE 9

By the same method, 630 g of TFE/PFA copolymer pellets (3 mm in diameter and 5 mm in length) was subjected to reaction with 8 g of $NF_3$ at 450° C. for 2 hr.

The TFE/PFA copolymer pellets turned into a wax which weighed 620 g (yield 98.4%), and small amounts of $CF_4$, $C_2F_6$ and $C_3F_8$ were formed as gaseous by-products. The wax had a melting point of 253° C. and could easily be pulverized.

EXAMPLE 10

By the same method 500 g of the TFE/PFA copolymer pellets was subjected to reaction with 8 g of $IF_3$ at 400° C. for 6 hr.

As the result 490 g (yield 98%) of low molecular weight TFE/PFA wax was obtained. Gaseous by-products were mostly $ClF_3$ and included small amounts of $CF_4$, $C_2F_6$ and $C_3F_8$. The wax had a melting point of 250° C. and could easily be pulverized.

EXAMPLE 11

A PCTFE pipe having an outer diameter of 10 mm was cut into 10 mm long pieces. By the same method as in Example 1, 500 g of the tubular pieces of PCTFE was subjected to reaction with 3 g of $F_2$ gas at 400° C. for 2 hr.

As the result 480 g (yield 96%) of low molecular weight PCTFE wax was obtained, while small amounts of $CF_4$, $C_2F_6$ and $CF_3Cl$ were formed as gaseous by-products. The wax had a melting point of 236° C. and could easily be pulverized.

EXAMPLE 12

By the same method 500 g of the PCTFE pieces mentioned in Example 11 was subjected to reaction with 8 g of $NF_3$ gas at 400° C. for 2 hr.

In this case 450 g (yield 90%) of low molecular weight PCTFE wax was obtained, while small amounts of $CF_4$, $C_2F_6$ and $CF_3Cl$ were formed as gaseous by-products. The wax had a melting point of 240° C. and could easily be pulverized.

What is claimed is:

1. A method of converting a fluorine-containing solid high polymer selected from the group consisting of polytetrafluoroethylene, polychlorotrifluoroethylene, poly(vinylidene fluoride), poly(vinyl fluoride), copolymers of tetrafluoroethylene and hexafluoropropylene, copolymers of tetrafluoroethylene and perfluoroalkoxyethylene and copolymers of ethylene and tetrafluoroethylene into a lower molecular weight polymer, the method comprising the step of subjecting said high polymer to contact reaction with a gas comprising at least one fluorine source material selected from the group consisting of molecular fluorine and binary compounds of fluorine and nitrogen at a temperature in the range from about 350° C. to about 500° C.

2. A method according to claim 1, wherein said gas comprises a binary compound of fluorine and nitrogen selected from the group consisting of $NF_2$, $NF_3$, $N_2F_2$, $N_2F_4$ and $N_3F$.

3. A method according to claim 1, wherein said gas further comprises a diluent gas.

4. A method according to claim 3, wherein said diluent gas is nitrogen gas.

* * * * *